United States Patent
Kim et al.

(10) Patent No.: US 10,962,769 B2
(45) Date of Patent: Mar. 30, 2021

(54) HEAD DEVICE OF THREE-DIMENSIONAL MODELLING EQUIPMENT HAVING MODELLING LIGHT SOURCE ARRAY AND POLYGONAL MIRROR, AND MODELLING PLANE SCANNING METHOD USING SAME

(71) Applicant: KOREA INSTITUTE OF INDUSTRIAL TECHNOLOGY, Cheonan-si (KR)

(72) Inventors: Seung Taek Kim, Seongnam-si (KR); Moon Soo Park, Yongin-si (KR); Jong Seok Kim, Ansan-si (KR); Hyung Tae Kim, Daegu (KR)

(73) Assignee: Korea Institute of Industrial Technology, Cheonan-si (KR)

( * ) Notice: Subject to any disclaimer, the term of this patent is extended or adjusted under 35 U.S.C. 154(b) by 574 days.

(21) Appl. No.: 15/543,052

(22) PCT Filed: Jan. 11, 2016

(86) PCT No.: PCT/KR2016/000224
§ 371 (c)(1),
(2) Date: Jul. 12, 2017

(87) PCT Pub. No.: WO2016/114531
PCT Pub. Date: Jul. 21, 2016

(65) Prior Publication Data
US 2018/0003956 A1    Jan. 4, 2018

(30) Foreign Application Priority Data
Jan. 12, 2015    (KR) .................. 10-2015-0004141

(51) Int. Cl.
*G02B 26/12*    (2006.01)
*B33Y 30/00*    (2015.01)
(Continued)

(52) U.S. Cl.
CPC .......... *G02B 26/127* (2013.01); *B29C 64/264* (2017.08); *B29C 67/00* (2013.01);
(Continued)

(58) Field of Classification Search
CPC .... G02B 26/127; G02B 26/101; B29C 67/00; G01B 11/25
See application file for complete search history.

(56) References Cited

U.S. PATENT DOCUMENTS

| | | |
|---|---|---|
| 5,626,919 A | 5/1997 | Chapman et al. |
| 5,780,070 A | 7/1998 | Tanazawa et al. |
| 2014/0263209 A1 | 9/2014 | Burris et al. |

FOREIGN PATENT DOCUMENTS

| | | |
|---|---|---|
| JP | 2000-015705 A | 1/2000 |
| KR | 10-1996-0024766 A | 7/1996 |
| KR | 10-2014-0047103 A | 4/2014 |

*Primary Examiner* — Jacob T Minskey
*Assistant Examiner* — Jennifer A Kessie
(74) *Attorney, Agent, or Firm* — Rabin & Berdo, P.C.

(57) ABSTRACT

The present invention relates to a head device of a three-dimensional modelling equipment, and a modelling plane scanning method using the same, the head device of a three-dimensional modelling equipment comprising: a modelling light source array having a plurality of modelling light sources; a light guide part, installed at a given position above a modelling plane, having a function of reflecting modelling rays from the modelling light source array so as to be incident on the modelling plane; and a controller for controlling the operations of the modelling light source array and the light guide part in a conjoined manner, wherein a plurality of modelling rays generated from the plurality of modelling light sources are irradiated while forming one line scan having a first axial direction on the modelling plane, and the light guide part continuously or intermittently moves the one line scan on the modelling plane to irradiate the modelling light rays across the modelling plane. The present (Continued)

invention has the effects of enabling high-speed scanning to be performed, and modelling precision to be enhanced through precise scanning control.

5 Claims, 4 Drawing Sheets

(51) Int. Cl.
  *B29C 67/00* (2017.01)
  *B29C 64/264* (2017.01)
  *G01B 5/00* (2006.01)
  *G01B 11/00* (2006.01)
  *G01B 11/25* (2006.01)
  *G02B 26/10* (2006.01)
  *G06K 9/32* (2006.01)
  *H04N 1/113* (2006.01)
(52) U.S. Cl.
  CPC ............ *B33Y 30/00* (2014.12); *G01B 5/0002* (2013.01); *G01B 11/005* (2013.01); *G01B 11/25* (2013.01); *G02B 26/101* (2013.01); *G06K 9/3233* (2013.01); *H04N 1/113* (2013.01)

HEAD DEVICE OF THREE-DIMENSIONAL MODELLING EQUIPMENT HAVING MODELLING LIGHT SOURCE ARRAY AND POLYGONAL MIRROR, AND MODELLING PLANE SCANNING METHOD USING SAME

CROSS-REFERENCE TO RELATED APPLICATION

This application claims priority to and the benefit of Korean Patent Application No. 10-2015-0004141, filed on Jan. 12, 2015, the disclosure of which is incorporated herein by reference in its entirety.

BACKGROUND OF THE INVENTION

Field of the Invention

The present invention relates to a head device of a three-dimensional modeling equipment and a method of scanning a modeling plane using the same, and more particularly, a head device of a three-dimensional modeling equipment and a method of scanning a modeling plane using the same having a configuration including a modeling light source array formed with a plurality of modeling light sources and a polygon mirror that performs a light guide function and that can scan modeling beams in a high speed with a combination thereof and that can enhance modeling precision through a precious scanning control.

Description of the Related Art 3D printing is one of methods of producing a product and uses a stacking method and thus has a small material loss and requires a relatively cheap production cost, compared with a conventional cutting processing and is thus generally used for producing a test product. Nowadays, technology of this field is recognized as next generation production technology as well as production of a test product, and due to increase of a production speed, increase of completeness (resolution) of an output product, various available materials, and a small-sized apparatus, individuals may use 3D printing. Such a 3D printing method includes a Stereo Lithography Apparatus (SLA), Selective Laser Sintering (SLS), and Fused Deposition Modeling (FDM).

In Korean Patent Laid-Open Publication No. 1996-0024766 (title of invention: three-dimensional shape forming apparatus using a light modeling apparatus, hereinafter, referred to as conventional art 1), in a light modeling apparatus of an X-Y plotter method, because a radiation time of laser light at acceleration and deceleration segments representing at a periphery of a driving start point of a servomotor and a periphery of a driving termination point is longer than that at a constant speed movement segment, in order to solve a problem that a modeling product is changed in a undesired structure, the three-dimensional modeling apparatus includes a controller that enables a motor to rotate in a target speed by correcting a control pulse based on a signal returned from a motor, a motor driver that supplies a driving voltage to the motor according to a control pulse output from the controller, and a laser oscillation unit that generates a laser beam, and an attenuator that attenuates a laser beam output to the scanning lens side according to the driving voltage.

SUMMARY OF THE INVENTION

Technical Problem

Figure 1:
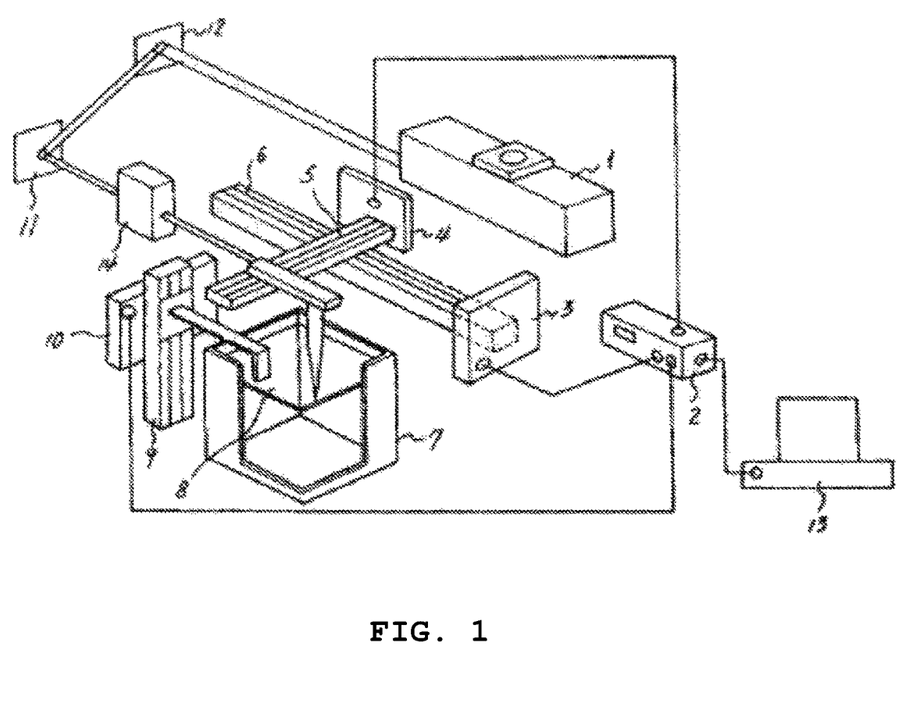
FIG. 1 is a schematic view of the conventional art 1.

In the conventional art 1 of FIG. 1, the conventional art 1 has a first problem that control accuracy is lower than a light path control method because a head directly moves to a light radiation point through two shaft moving rails to radiate modeling beams, a second problem that directly moves a relatively heavy head and that a modeling quality is deteriorated due to a vibration occurring according to acceleration and deceleration of such a head, and a third problem that such a vibration problem becomes further serious when increasing a modeling speed.

Solution to the Problem

In accordance with an aspect of the present invention, a head device of a three-dimensional modeling equipment that radiates modeling light in a predetermined scanning pattern to a modeling plane including a first shaft 1 and a second shaft 2 perpendicular to each other includes a modeling light source array 15 having a plurality of modeling light sources 16 arranged in a line in a direction parallel to the first shaft 1; a light guide unit 20 installed at a predetermined position of an upper portion of the modeling plane and having a function of reflecting modeling beams from the modeling light source array 15 to apply the modeling beams on the modeling plane; and a control unit 40 that controls to interlock driving of the modeling light source array 15 and the light guide unit 20, wherein a plurality of modeling beams generated in the plurality of modeling light sources 16 form and apply one line scan 12 having a direction of the first shaft 1 on the modeling plane, and the light guide unit 20 continuously or intermittently moves one line scan 12 on the modeling plane to radiate modeling light to an entire surface of the modeling plane. A head device of a three-dimensional modeling equipment of such a configuration has a modeling light source array 15 formed with a plurality of modeling light sources 16 to perform line scan of one shaft direction of a modeling plane and thus a modeling speed may be faster than when performing a scan work of an existing moving method.

Advantageous Effect(s) of the Invention

A head device of a three-dimensional modeling equipment according to the present invention includes a modeling light source array 15 formed with a plurality of modeling light sources 16 and has a first effect having a modeling speed faster than that of a scan work of an existing moving method by enabling the modeling light source array 15 to perform line scan of one shaft direction in a modeling plane, a second effect that enables to perform stepping in one shaft direction different from a line scan shaft through a polygon mirror 21 rotating in a single direction and that can reduce a vibration and noise occurring in the head device by preciously controlling a radiation position of modeling beams through the control of a rotation angular velocity and a rotation angle displacement of the polygon mirror 21 and that can thus enhance a quality of a modeling layer formed in a modeling plane, and a third effect that can increase a modeling quality by implementing an uniform modeling beam output density at an entire modeling plane by controlling an output value of modeling beams through a controller or by applying a modeling beam incident angle compensation unit. Further, a head device of the present invention can be applied to a three-dimensional modeling apparatus of an SLS method or various methods including an SLS method.

DERAILED DESCRIPTION OF THE PREFERRED EMBODIMENTS

The present invention has been made in view of the problems and provides a head device of a three-dimensional modeling equipment that radiates modeling light in a predetermined scanning pattern over an entire surface of a modeling plane including a first shaft 1 and a second shaft 2 perpendicular to each other may include a modeling light source array 15 having a plurality of modeling light sources 16; a light guide unit 20 installed at a predetermined position of an upper portion of the modeling plane and having a function of reflecting modeling beams from the modeling light source array 15 to apply the modeling beams on the modeling plane; and a control unit 40 that controls to interlock driving of the modeling light source array 15 and the light guide unit 20, wherein a plurality of modeling beams generated in the plurality of modeling light sources 16 form and apply one line scan 12 having a direction of the first shaft 1 on the modeling plane, and the light guide unit 20 continuously or intermittently moves one line scan 12 on the modeling plane to radiate modeling light to an entire surface of the modeling plane.

A method of scanning a modeling plane according to the present invention may include step of setting a polygon mirror 21 at a predetermined position; step of starting, by a modeling light source array 15, to apply a plurality of modeling beams on the reflective surface of the polygon mirror 21; step of performing, by the plurality of modeling beams reflected from the polygon mirror 21, line scan 12 of a direction parallel to a first shaft 1 in the modeling plane for a predetermined time; step of terminating line scan 12 by controlling the plurality of modeling beams not to radiate on the modeling plane; step of rotating, by the polygon mirror 21, by a predetermined angle displacement in order to perform next line scan 12 after stepping by a predetermined gap in a direction of a second shaft 2; and step of repeatedly performing the steps until scanning of an entire surface of the modeling plane is complete.

A method of scanning a modeling plane according to the present invention may include step of setting a polygon mirror 21 at a predetermined position; step of starting, by a modeling light source array 15, to apply a plurality of modeling beams on a reflective surface of the polygon mirror 21 while the polygon mirror 21 starts to rotate in a predetermined speed; step of performing, by the plurality of modeling beams reflected from the polygon mirror 21, line scan 12 of a direction parallel to the first shaft 1 in the modeling plane, wherein such line scan is continuously performed while the polygon mirror 21 continues to rotate in a predetermined speed; and step of terminating continuous line scan 12, when scanning of an entire surface of the modeling plane is complete.

Further, a three-dimensional modeling apparatus of the present invention may perform radiation of modeling beams to a modeling plane using the foregoing head device.

MODE FOR INVENTION

Figure 2:
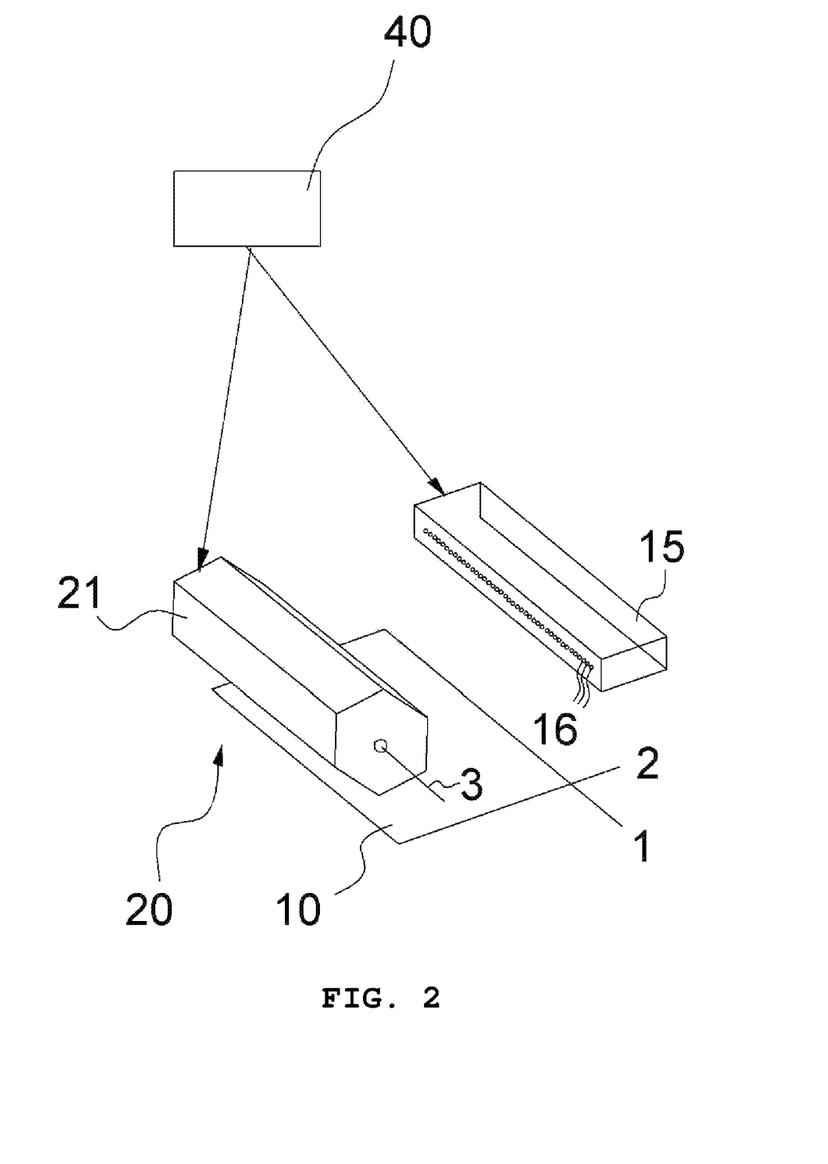
FIG. 2 is a schematic view illustrating a configuration of a head device of a three-dimensional modeling equipment according to an exemplary embodiment of the present invention.

As shown in a schematic view of FIG. 2, a head device of a three-dimensional modeling equipment according to the present invention performs a function of radiating modeling light in a predetermined scanning pattern over an entire surface of a modeling plane while having, as major constituent elements, a light source array 15 having a plurality of modeling light sources 16 arranged in a line, a light guide unit 20 having a function of reflecting modeling beams from the modeling light source array 15 to apply the modeling beams on the modeling plane, and a control unit 40 that controls to interlock driving of the modeling light source and the light guide unit 20.

Particularly, a scanning pattern suggesting in the present invention, as described later, may be a pattern in which line scan 12 of a direction parallel to a first shaft 1 forming a modeling plane is repeated while stepping by a predetermined distance in a direction of a second shaft 2 forming a modeling plane or may be a pattern in which line scan is continuously performed in a second shaft direction. At the former, after the line scan 12 of one time is terminated, next line scan 12 is performed at a position stepped by a predetermined distance in a direction of the second shaft 2. From an output viewpoint of a modeling light source, at the former, an output is controlled to sequentially discretely change, and at the latter, an output is controlled to sequentially continuously change. In this case, a term of the line scan 12 may mean a work in which a plurality of modeling beams generated in a plurality of modeling light sources 16 perform while being applied on the modeling plane and mean a modeling portion formed through such a work.

Hereinafter, before describing the present invention with a method of describing major constituent elements and an exemplary embodiment, related terms are defined.

A modeling plane may mean a radiation area of modeling beams whose path is controlled in a head device of a three-dimensional modeling equipment of the present invention, and in order to mathematically represent such an actual radiation area of modeling beams, the modeling plane includes a first shaft 1 and a second shaft 2 perpendicular to each other, a position on a plane thereof as a coordination value according to the first shaft 1 and the second shaft 2 may mean a logic area. Even if an actual modeling plane is directly exposed to the outside or even if an actual modeling plane cannot directly receive radiation of modeling beams, the actual modeling plane may be in a state blocked by a transparent member in which modeling beams can transmit. Further, when energy is given to modeling beams, a region in which operation such as light curing or sintering curing occurs is limited to a modeling plane region and thus a modeling plane may be referred to as an effective modeling region.

The first shaft 1 and the second shaft 2 become a reference when describing a scanning direction and a pattern of modeling beams in a modeling plane, a position of a rotation shaft of the polygon mirror 21, or an arrangement direction of the modeling light source 16. The first shaft 1 and the second shaft 2 are randomly positioned on an actual modeling plane.

Figure 3:
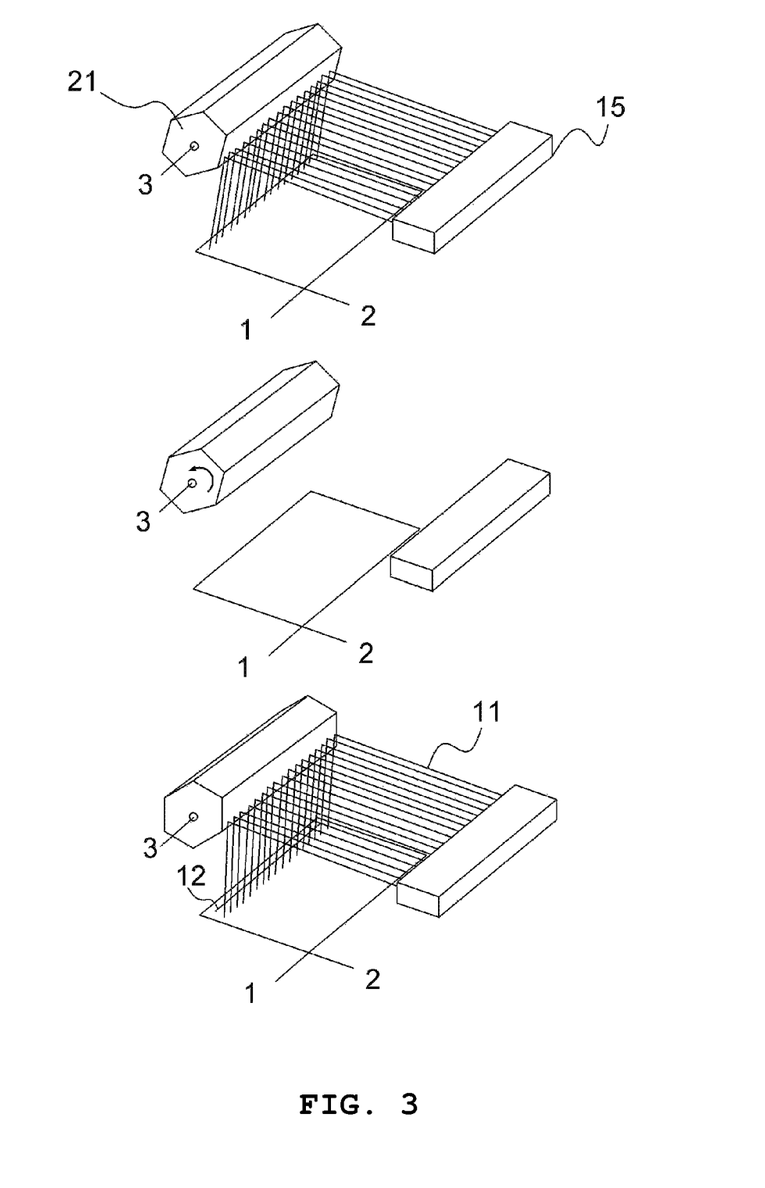
FIG. 3 is a perspective view illustrating a method of scanning a modeling plane using a head device of a three-dimensional modeling equipment according to an exemplary embodiment of the present invention.

As shown in an exemplary embodiment of FIG. 3, the modeling light source array 15 performs a function of generating modeling beams and applying the modeling beams to the light guide unit 20 to be described later. In the present invention, the modeling light source array 15 is arranged in a line in a direction parallel to the first shaft 1. A plurality of modeling beams generated in the modeling light source array 15 through such a configuration may perform the line scan 12 in a line on a modeling plane parallel to the first shaft 1. When determining a gap between a plurality of modeling light sources 16, after one line scan 12 is terminated, in an entire portion of a corresponding line, a light curing/sintering request level (spec) of a modeling material should be satisfied in the same level. When the gap is so large, a difference occurs in a light curing/sintering level on a portion basis in one line and thus a modeling quality is deteriorated, and when the gap is so small, a problem may occur that much energy is unnecessarily radiated. Further, when an output of the modeling light source 16 is large, a gap between the modeling light sources 16 may largely increase. It is preferable that a length of the modeling light source array 15 becomes a length or more of at least one side of a modeling plane, and this is because a modeling time may be shortened when one line scan 12 is radiated one time by a length corresponding to one side of the modeling plane. Further, when a gap between the foregoing modeling light sources 16 and a length of the modeling light source array 15 are determined, the number of the modeling light source array 15 is automatically calculated.

The modeling light source 16 is an element that performs a function of generating modeling beams, and because modeling beams should have energy necessary for curing a use modeling material, ultraviolet rays and laser can be selected. However, when using laser, high energy may be focused and output intensity and on/off control thereof may be easily performed and thus laser is appropriate for use as modeling beams. An output and wavelength of laser should be determined according to a use modeling material. As the modeling light source 16 for generating laser, optical fiber laser including a device such as a laser diode (LD) or VCSEL or an optical fiber bundle may be applied and the present invention is not limited thereto, and when rays of a single channel are required as modeling beams, it is unnecessary to always use a single element, and various elements (e.g., relay module) having a coupling and distribution function of rays (light signal) may be used. Further, design of a configuration that enhances a quality of modeling beams or that forms a head device in a small size by applying an optical element such as various light modulation modules, focusing lenses, or prisms may be considered. Because the modeling light source array 15 is formed with a plurality of modeling light source 16 elements, shape information of a three-dimensional modeling product should be formed into digital data and divided into predetermined unit information. It should be considered that a gap between such modeling light source elements is a closely related to a modeling resolution.

The light guide unit 20 is installed at a predetermined position of an upper portion of the modeling plane and implements a function of reflecting modeling beams from the modeling light source array 15 to apply the modeling beams on a modeling plane and a function of stepping each line scan 12 of a first shaft direction in a second shaft 2 direction in order to prevent an omitted portion from occurring when radiating modeling beams to the modeling plane. In a configuration of the light guide unit 20, the predetermined number of light reflecting surfaces are provided, and the head device according to the present invention includes the polygon mirror 21 rotating about a polygon mirror shaft 3 parallel to a rotation shaft (the first shaft 1). In the polygon mirror 21, a sectional shape vertical to a rotation shaft becomes a polygon, and a side surface should be configured to reflect modeling beams. More preferably, when the polygon mirror 21 having a sectional shape of a regular polygon is selected, a precise control of a rotation speed and rotation direction of the polygon mirror 21 may be easily performed and thus the polygon mirror 21 is advantageous. The polygon mirror 21 may have a cross-section of a square, a regular pentagon, a regular hexagon, and a regular octagon, but the present invention is not limited thereto. As described later, because one line scan 12 is performed by one side reflection surface of the polygon mirror 21, when variables of a regular polygon of a cross-section of the polygon mirror 21 are small (e.g., a square), there is a merit that a length of the line scan 12 may be extended, but in order to perform one line scan 12, a rotation angle displacement of the polygon mirror 21 should be further increased and thus in order to obtain the same modeling speed, there is a drawback that a rotation speed of the polygon mirror 21 should be further increased. Therefore, by selecting the polygon mirror 21 of an appropriate shape according to a size of a modeling plane, it is necessary to combine such a merit and drawback. Further, it is preferable that a length of the polygon mirror 21 is equal to or larger than that of the modeling light source array 15. A reflection surface of a side surface of the polygon mirror 21 may be a rectangle or a trapezoid having the same shape and size and thus an entire shape of the polygon mirror 21 may be a regular polygonal pillar or a regular polypyramid. That is, the polygon mirror 21 may be configured in one shape of a regular polygonal pillar and a regular polypyramid according to variables such as an installation angle of a rotation shaft of the polygon mirror 21 and an incident angle of modeling beams, or an entire size of the head device of the present invention. In exemplary embodiments of FIGS. 2 to 4, the light guide unit 20 is implemented in a shape of a regular hexagonal pillar. A rotation shaft of the polygon mirror 21 may be installed at a predetermined position of an upper portion of a modeling plane with various methods.

The control unit 40 controls to interlock driving of the modeling light source array 15 and the light guide unit 20, and a detailed control target thereof will be on/off and an output value of each modeling light source 16 forming the modeling light source array 15 and driving (rotation/stop) of the light guide unit 20. A radiate position is specified in a modeling plane of the modeling beams according to a rotation angle control of the polygon mirror 21 of the light guide unit 20, and at a radiation position specified in this way, driving of a plurality of modeling beams should be controlled through the control of the modeling light source 16 based on modeling layer image information. Thereby, when radiation of modeling beams to one modeling plane is complete, one modeling layer is shaped, and such modeling layers are layered to complete a three-dimensional modeling product.

The control of the modeling light source array 15 means the interlocking control of each modeling light source 16. Particularly, when controlling the modeling light sources 16 by synchronizing, each modeling beam forming the line scan 12 is simultaneously applied to the modeling plane and thus because scanning, i.e., so-called 'temporary line scan' in one shaft direction of a modeling plane may be complete with only radiation for one unit time (this is related to a ray radiation time necessary for light curing/sintering of a modeling material), a modeling time can be minimized. However, driving of each modeling light source 16 is not excluded such that scanning of one shaft direction of a modeling plane implement 'moving line scan' by necessity.

The control unit 40 includes a processing unit that generates an appropriate control signal for a control variable and a driver that drives a corresponding constituent element by processing a control signal that has occurred in the processing unit. The processing unit may be implemented with hardware such as a circuit or may be implemented with software such as a program. The on/off control of modeling beams may be performed by a configuration of the on/off control of a modeling beam generation element (LD or VCSEL), and may be implemented by the control of modeling beams generated by a modeling beam generation element with an additional constituent element such as a shutter that sequentially selectively pass or block the modeling beams, but it is not limited to such a configuration. The output value control of modeling beams is to control, specifically, an amplitude or a frequency of modeling beams, and this is required to correct the difference of a light path length necessary when modeling beams arrive at each point forming a modeling plane or the difference of a modeling beam output density at the each point caused according to the difference of an incident angle of modeling beams. When describing this, if modeling beams are vertically applied to a modeling plane, an incident area becomes a minimum and thus a modeling beam output density increases, and in contrast, if modeling beams are applied to a modeling plane in an oblique angle, an incident area increases and thus a modeling beam output density decreases. However, because a level of operation such as curing (light curing or powder sintering) of modeling beams to a modeling material is proportion to intensity of a modeling beam output density, in order to secure a quality of a modeling layer by guaranteeing a uniform modeling beam output density over an entire area of the modeling plane, it is necessary to control an output value of the modeling beams. Further, particularly, when the head device of the present invention is formed in a large size, the difference occurs in an energy loss level of modeling beams according to a light path length necessary when modeling beams arrive at each point forming a modeling plane and thus correction thereof is required.

Figure 4:
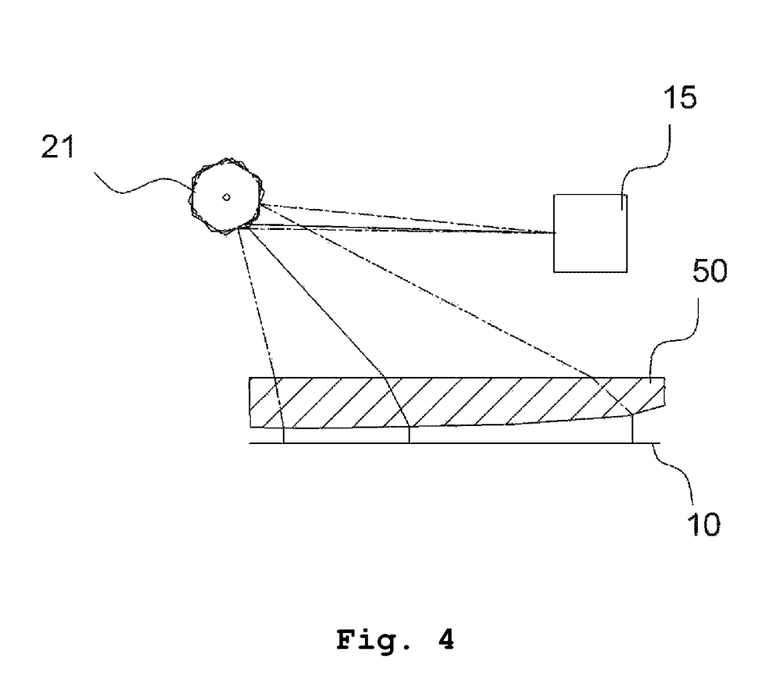
FIG. 4 is a cross-sectional view illustrating a modeling beam incident angle compensation unit according to an exemplary embodiment of the present invention.

Further, a head device of a three-dimensional modeling equipment of the present invention may include a modeling beam incident angle compensation unit having a function of enabling modeling beams to be vertically applied to a modeling plane at an entire point forming a modeling plane. As described above, the modeling beam incident angle compensation unit makes a modeling beam output density uniform according to each incident point. The modeling beam incident angle compensation unit in an exemplary embodiment of FIG. 4 is a lens installed at an upper portion of a modeling plane, and the modeling beam incident angle compensation unit performs a function of inducing modeling beams to be vertically applied on the modeling plane through twice refraction processes, even if an incident angle of modeling beams reflected from the light guide unit 20 is different on each point basis.

The control of the light guide unit 20 of the control unit 40 is performed by the rotation control of the polygon mirror 21, and a rotation angular velocity, a rotation angle displacement, and rotation angular acceleration of the polygon mirror 21 become a main control variable thereof. For a control signal of the control unit 40, it is necessary that such control variables follow with a small error within a small lead time, and for this reason, it is preferable to use an electric control method. More preferably, an electric servomotor may be used that can implement the rotation angular velocity, the rotation angle displacement, and the rotation angular acceleration to correspond to a sequentially changing control signal (electric signal), but the present invention is not limited thereto. A stepping gap (size) is determined according to a rotation angle of the polygon mirror 21, and when a value thereof is so small, the line scan 12 is formed and thus modeling beams are again radiated to a portion in which curing is already performed and thus it is inefficient, and when a value thereof is so large, it should be considered that a portion occurs in which modeling beams are not radiated.

Hereinafter, additional consideration contents will be described in implementing a scanning pattern by disposing the foregoing major constituent elements on a space. In an exemplary embodiment of FIG. 3, modeling beams from the modeling light source array 15 are radiated parallel to a modeling plane, but it may be considered that modeling beams are radiated while forming a constant angle from a modeling plane. Because such suggestions are required for implementing a required function using a minimum constituent element, a complex configuration by change of a portion of disposition using other optical elements such as a reflector and a prism or a configuration of change of an angle of rays in a predetermined level may be in the same range as or a range equivalent to a configuration of the present invention.

Stepping of the second shaft 2 direction is described. For stepping of such a second shaft direction, setup parameters such as a stepping distance gap and a stepping time interval may be considered, and these parameters are related to various variables such as an output of modeling beams, a setup thickness of a modeling layer, a kind of a modeling material, and a gap between modeling light source elements. Further, modeling beams generated in one modeling light source arrive at a modeling plane to transfer energy (to be a cause of light curing or sintering operation) to a modeling material, and such energy is transmitted to an area having a predetermined area and depth instead of a specific point. When an output density of modeling beams is large, even if radiation is performed for the same time, energy is transferred over a more wide area and thus a stepping distance gap of a second shaft direction may be relatively largely formed. Further, because a stepping distance gap exists in a second shaft direction, line scan should be performed for a predetermined time, and such a time should be determined in consideration of an output and a stepping distance gap.

As a method of scanning a modeling plane using a head device of the present invention, the following two exemplary embodiments are suggested according to a rotation control pattern of the polygon mirror 21 of the light guide unit 20. Before a description, it is assumed that a modeling material is actually supplied and positioned in the foregoing modeling plane. When scanning of modeling beams is complete in one modeling plane, one modeling layer is formed, and such modeling layers are layered to form one three-dimensional modeling product. When scanning a modeling plane, a portion should not exist in which modeling beams are not radiated, and it is preferable to perform scanning through an optimal path that can minimize a scanning consumption time.

First Exemplary Embodiment

Stepping in the second shaft 2 direction should be performed after one line scan 12 is completely terminated, and after stepping in the second shaft 2 direction is completely terminated, next line scan 12 should be performed. That is, stepping of the second shaft 2 direction as well as the line scan 12 should be discontinuously or discretely performed. That is, in a state in which the polygon mirror 21 is stopped, one line scan 12 is performed, and when the line scan 12 is terminated, the polygon mirror rotates by a predetermined angle and stops, and next line scan 12 is performed. Because such a method may apply sufficient energy to a modeling beams radiation point, a modeling layer thickness may be largely set, and in a stepping process, there is a merit that a rotation speed of the polygon mirror 21 may be quickly set.

When representing a scanning process in time series, first, the polygon mirror 21 is set at a predetermined position. An initial position of the polygon mirror 21 is adjusted such that modeling beams are applied to a predetermined portion of an edge of a modeling plane. Second, the modeling light source array 15 starts to apply a plurality of modeling beams on the reflective surface of the polygon mirror 21. Third, the plurality of modeling beams reflected from the polygon mirror 21 performs the line scan 12 in a modeling plane in a direction parallel to the first shaft 1 for a predetermined time. As described above, it is advantageous to reduction of a modeling time to (temporally) drive each modeling light source 16 by synchronizing. Fourth, a plurality of modeling beams are controlled not to be radiated to the modeling plane and thus the line scan 12 is terminated. In this case, the control may apply use of an additional constituent element such as a shutter and output off of a modeling light source and use of a blocking film installed at a periphery of a modeling plane, and a method of lowering an output of modeling beams to a level in which curing or sintering operation of a modeling material does not occur, even if modeling beams are applied to a modeling plane, may be considered. Fifth, after stepping is performed by a predetermined gap in the second shaft 2 direction following immediately preceding line scan 12, in order to perform next line scan 12, the polygon mirror 21 rotates by a predetermined angular displacement. Sixth, until scanning of an entire surface of the modeling plane is complete, the second step to the fifth step are repeatedly performed. It is preferable that the polygon mirror 21 continues to rotate in a predetermined one-direction. However, after radiation to one modeling plane is complete, when radiating to a next modeling plane, the polygon mirror 21 may rotate in the same direction as a rotation direction in an immediately preceding modeling plane radiation process and may rotate in an opposite direction.

Second Exemplary Embodiment

Line scan is a method of continuously sweeping a modeling surface in a predetermined speed (such a speed has a function relation with a rotation angular velocity of a polygon mirror). In this case, when a speed is so fast, it should be considered that sufficient energy cannot be applied to a modeling beam radiation point. However, setup such as increase of a light source output or narrow setup of a gap between modeling light source elements may be considered. Further, by setting a modeling layer thickness to be small, necessary energy may be reduced, and because a polygon mirror can continuously rotate when using a scanning pattern of such a method, a vibration and noise occurring in a rotation/stop process of the polygon mirror 21 may be reduced and thus there is a merit that a modeling quality and a work environment may be well set. This scanning method is performed by controlling an output of a modeling light source to sequentially continuously change.

When representing a scanning process in time series, first, the polygon mirror 21 is set at a predetermined position, second, while the polygon mirror 21 starts to rotate in a predetermined speed, the modeling light source array 15 starts to apply a plurality of modeling beams on the reflective surface of the polygon mirror 21. Third, the plurality of modeling beams reflected from the polygon mirror 21 perform line scan 12 of a direction parallel to the first shaft 1 in the modeling plane, and such line scan is continuously performed while the polygon mirror 21 continues to rotate in a predetermined speed. Fourth, when scanning of an entire surface of the modeling plane is complete, continuous line scan 12 at a former step is terminated.

Here, a rotation speed of the polygon mirror 21 may be set to a constant velocity (in such a configuration, a vibration and noise may be reduced). It may be considered to decrease a rotation speed while modeling beams are applied to a modeling plane and to relatively increase a rotation speed in a stepping process, but the latter case has an advantage in a modeling time, but a symbol of rotation acceleration is repeatedly changed to + and − and thus a vibration and noise may inevitably occur. Fourth, until scanning of an entire surface of the modeling plane is complete, the second step and the third step are repeatedly performed. Even in this case, it preferable that the polygon mirror 21 continues to rotate in a predetermined one direction. However, after radiation to one modeling plane is complete, when radiation to a next modeling plane is performed, the polygon mirror 21 may rotate in the same direction as a rotation direction in an immediately preceding modeling plane radiation process or may rotate in an opposite direction.

The present invention has been described together with the accompanying drawings, but this is merely an exemplary embodiment of various embodiments including the subject matter of the present invention, the object of the present invention is to enable a person of ordinary skill in the art to easily execute the present invention, and it is clear that the present invention is not limited to the described exemplary embodiment. Therefore, the scope of the present invention should be analyzed by claims, and many variations and modifications of the basic inventive concepts herein taught that may appear to those skilled in the present art will still fall within the spirit and scope of the present invention, as defined in the appended claims. Further, some configurations of the drawings may be provided in an excessive size or a reduced size further than an actual size in order to more clearly describe a configuration.

DESCRIPTION OF SYMBOLS

1: first shaft
2: second shaft
3: polygon mirror shaft
10: modeling plane
11: modeling beams
12: line scan
15: modeling light source array
16: modeling light source
20: light guide unit
21: polygon mirror
40: control unit
50: modeling beam incident angle compensation unit

What is claimed is:

1. A head device of a three-dimensional modeling equipment that radiates modeling light in a predetermined scanning pattern to a modeling plane comprising a first shaft and a second shaft perpendicular to each other, the head device comprising:
- a modeling light source array having a plurality of modeling light sources arranged in a face of the modeling light source array in a line to perform a line scan in a direction parallel to the first shaft;
- a light guide unit installed at a predetermined position of an upper portion of the modeling plane and having a function of reflecting modeling beams from the modeling light source array to apply the modeling beams on the modeling plane; and
- a control unit that controls to interlock driving of the modeling light source array and the light guide unit, wherein
- a plurality of modeling beams generated in the plurality of modeling light sources form and apply one line scan having a direction of the first shaft on the modeling plane,
- a length of the modeling light source array is a length or more of at least one side of the modeling plane, and
- the light guide unit continuously or intermittently moves one line scan on the modeling plane and continuously sweeps the modeling plane to radiate modeling light to an entire surface of the modeling plane,
- wherein the light guide unit comprises a polygon mirror having a predetermined number of light reflecting surfaces at a side surface thereof and having a shape of regular polyprism and installed using a polygon mirror shaft parallel to the first shaft as a rotation center shaft, and
- wherein an entirety of the plurality of modeling light sources is synchronized and driven, and each modeling beam forming the line scan is simultaneously applied to the modeling plane.

2. The head device of claim 1, wherein the modeling light source is any one of optical fiber laser comprising a laser diode, a vertical cavity surface emitting laser (VCSEL), or an optical fiber bundle.

3. The head device of claim 1, further comprising a modeling beam incident angle compensation unit having a function of vertically applying the modeling beams to the modeling plane at an entire surface forming the modeling plane.

4. The head device of claim 1, wherein the control unit controls an amplitude or a frequency of the modeling beams in order to correct a difference of path lengths necessary when the modeling beams arrive at each point forming the modeling plane or a difference of modeling beam output densities at each point caused according to a difference of incident angles of the modeling beams.

5. The head device of claim 1, wherein
- the face of the modeling light source array is opposite at least one of the predetermined number of light reflecting surfaces of the polygon mirror, and the plurality of modeling light sources are spaced apart from each other along the line in the direction parallel to the first shaft, and configured so that a plurality of modeling light beams are projected in parallel along the line in the direction parallel to the first shaft from the plurality of modeling light sources onto the at least one of the predetermined number of light reflecting surfaces, and
- a gap between the plurality of modeling light sources is determined such that an entire line of a modeling material corresponding to the one line scan is sintered or cured to a same level.

\* \* \* \* \*